Aug. 19, 1947.  F. E. BACHMAN  2,425,979

SLACK ADJUSTER FOR RAILWAY BRAKE RIGGING

Filed Sept. 16, 1944

INVENTOR.
Fred E. Bachman
BY
Atty

Patented Aug. 19, 1947

2,425,979

UNITED STATES PATENT OFFICE 2,425,979

SLACK ADJUSTER FOR RAILWAY BRAKE RIGGING

Fred E. Bachman, Chicago, Ill., assignor to American Steel Foundries, Chicago, Ill., a corporation of New Jersey Application September 16, 1944, Serial No. 554,378

12 Claims. (Cl. 188—197)

1

My invention relates to brake rigging and more particularly to a slack adjuster for railway brake rigging.

It is an object of my invention to provide a slack adjuster for taking up slack in the brake rigging due to the wear of brake rigging and the associated parts.

Another object of my invention is to provide a reliable and efficient slack adjuster of the adjusting screw type, which is of relatively simple construction and also which is sufficiently compact to permit its use in confined quarters in the brake rigging, thereby meeting clearance conditions that will not permit utilization of the long single screw type adjuster of present design commonly used in railway and other vehicles.

Figure 1:
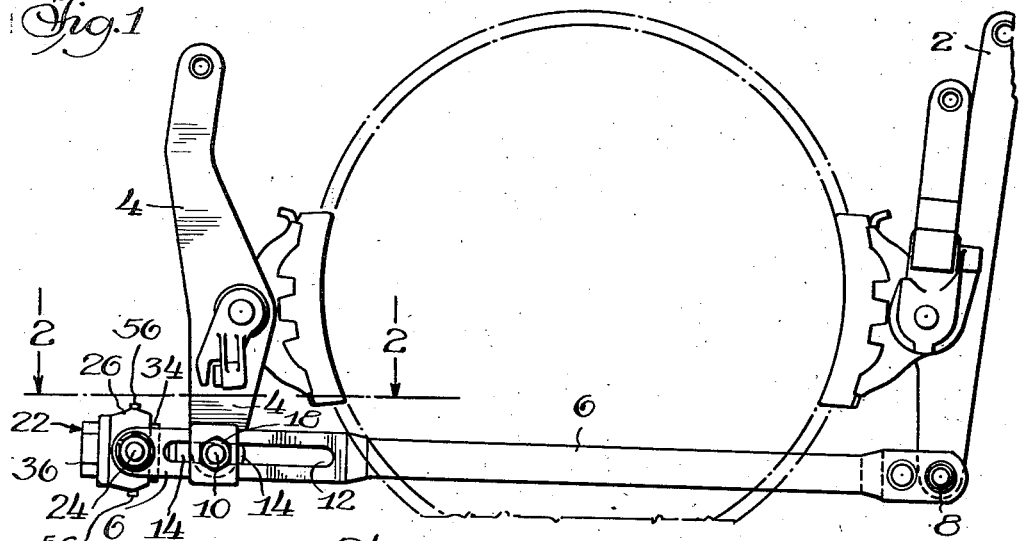
Figure 1 is a diagrammatic view of a car brake equipment embodying my invention.

Describing my invention in detail, and referring first to Figure 1, my novel slack adjuster is illustrated in its embodiment in brake rigging for a railway car truck which comprises the levers 2 and 4 and straps 6 extending therebetween on opposite sides thereof. Each strap 6 is pivotally connected at one end thereof to the lever 2 by a bolt and nut assembly 8 and adjacent the other end thereof to the lever 4 by a bolt 10 extending through aligned slots 12 in the straps and openings in the lever 4 and a clevis screw 14.

The lever 4, clevis screw 14, straps 6, as well as the spacing members 16, are retained on the bolt 10 by means of a nut 18 screwed onto the end of the bolt and a spring 20 is sleeved on the bolt and compressed between a strap 6 and the nut 18 to prevent undue movement and rattling of the straps.

Figure 2:
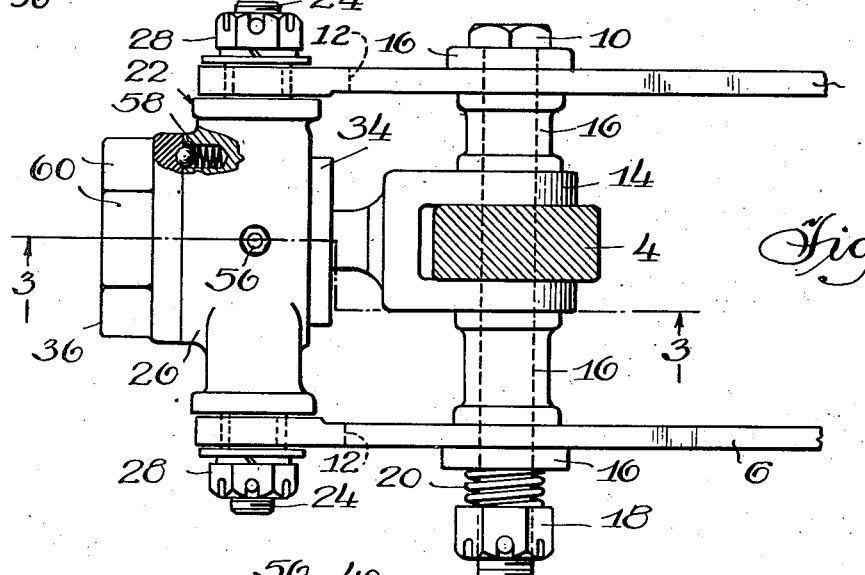
Figure 2 is a top plan view taken on the line 2—2 of Figure 1.
Figure 3:
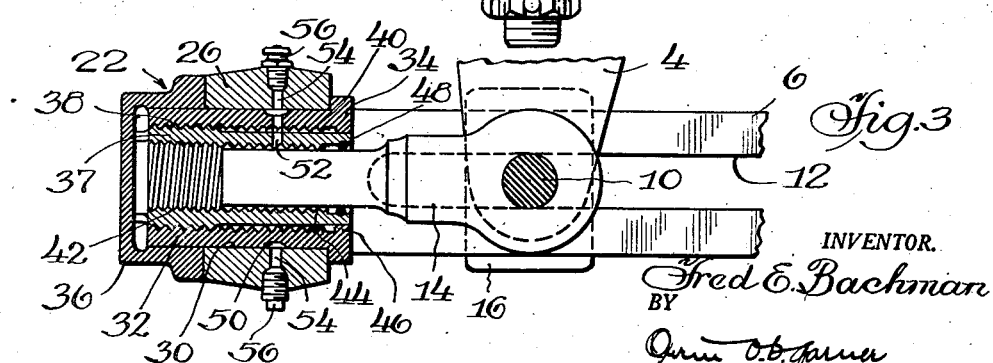
Figure 3 is a side elevation partly in section taken in the planes indicated by the line 3—3 of Figure 2.

In accordance with the present invention, the ends of the strap 6 adjacent the lever 4 are connected to the slack adjuster, generally indicated at 22, by threaded pins 24 fixed to the body or casing 26 of the adjuster, the opposite ends thereof extending into aligned openings in the straps and securing the straps thereto by nuts 28, said nuts being held against unwanted movement by means of associated lock washers and cotter keys, as clearly shown in Figure 2.

The casing 26 is provided with a bore 30 extending transversely thereof for receiving a cylindrical bushing or nut 32 rotatably mounted

2 therein. To prevent axial movement of the nut, the nut 32 is formed with an enlarged end or flange 34 in engagement with one side of the casing 26 and the other end of the nut 32 extends outwardly of the casing 26, and a hexagonal cap 36 is suitably secured thereto as by shrink fitting the same on the nut end, the cap engaging the side of the casing 26, and, thus, in connection with the flange 34, serves to hold the nut in position in the casing 26 while allowing rotation of the nut and the cap fixed thereto relative to the casing 26.

The nut 32 is provided with a centrally disposed threaded bore for receiving a sleeve 37 having a raised threaded portion on the outer surface of the same adjacent the cap 36, as indicated at 38, for engagement with the threads of the nut 32, the threaded portion 38 of said surface defining with said nut a deformable chamber 40 therebetween, in which the threads of the sleeve travel in operation of the adjuster. The internal surface of the sleeve 37 is threaded for substantially its entire length for engagement with the raised threads 42 at one end of the clevis screw 14, and it may be noted that the number of threads on the screw 14 are substantially less than those on the sleeve 37, whereby a deformable chamber 44 is had between said sleeve and screw in which the threads of the screw travel in operation of the adjuster.

It is within the contemplation of my invention to form the engaged threads of the sleeve 37 and nut 32 of the same pitch and running in the same direction, either left- or right-hand, as the engaged threads of the sleeve 37 and screw 14, so that upon rotation of the cap 36, the screw 14 and the sleeve 37 will move outwardly of the casing 26 to effect relative movement of the brake levers 2 and 4 to take up the slack in the brake rigging. To limit extension of the screw and sleeve, the nut 32 is formed with an offset portion 46 for abutment with the outer threads of the sleeve 37, and a split ring 48 is inserted between the sleeve and the screw for engagement with the threads of the screw to limit outward movement of the screw. It will be apparent that, if desired, the threaded arrangement for the slack adjuster may be such as that had in a differential or compound screw, which latter arrangement would provide the advantages of coarse thread strength with very fine adjustment. It may be noted that either thread arrangement will permit the compact construction of the slack adjuster to be used in confined quarters of the brake rigging, while permitting a wide range of adjustment for taking up the slack caused by the wear of the brake shoes and the members of the brake rigging.

A groove 50 is formed around the periphery of the nut 32 adjacent the enlarged end 34 thereof, and disposed in alignment with the groove is a duct 52 extending through the sleeve 37 and nut 32, and a duct 54 on opposite sides of the casing 26, each duct 54 terminating in an enlarged screw threaded aperture for accommodating a fitting 56. When the nut 32 is adapted to have rotation within the casing 26, lubrication of the surfaces can, therefore, be easily taken care of by forcing any suitable lubricant through the fittings 56 and ducts 54 to the groove 50, where it will pass through the duct 52 into the chambers 40 and 44 for lubrication of the threads on the sleeve 37 and the threads on the nut 32 and screw 14 in engagement therewith. A spring-actuated detent 58 may be mounted in the side of the casing 26 for engaging recesses in the rotatable cap 36 and serving as an impositive stop for holding the cap and screw 14 in any position to which it may be adjusted.

In operation of the slack adjuster, the straps 6 may comprise any straps of the brake rigging having connections at opposite ends thereof to the truck levers, and connection to the same is effected by pivotally joining one of the truck levers to one end of the straps and the other truck lever to the clevis screw 14 connected to the other end of the straps. Movement of the screw 14, therefore, relative to the casing 26 will function to vary the relative position of the straps 6 and lever 2. For adjusting the position of the clevis screw 14, it is only necessary to cause rotation of the cap 36, which will function to cause movement of the screw 14 through the threaded engagement of the sleeve 37 with the nut 32 and screw 14. The movement of the screw will thus cause the bolt 10 to slide in the slots 12 of the straps 6 and move the lower ends of the levers toward each other through their connection to the straps 6 for taking up slack in the brake rigging. It may be noted that the hexagonal outer portion of the cap 36 provides flat surfaces 60 forming means whereby the same can be readily gripped by any suitable tool.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake slack adjuster, a casing adapted for connection to an associated brake element, a screw having one end extending into an opening through said casing and the other end formed for connection to another brake element, a nut rotatably mounted in said opening and projecting from said casing on opposite sides thereof, means for preventing axial movement of said nut with respect to said casing including a flange integral with one end thereof engaging one side of said casing and a cap fixed to the other end thereof engaging the other side of said casing, a sleeve within said nut and receiving said screw, said sleeve having threaded engagement with said screw and nut at one end thereof, whereby rotation of said nut causes longitudinal movement of said sleeve and said screw, and stop means for preventing extension of said screw and sleeve beyond predetermined limits.

2. In a brake slack adjuster, a casing adapted for connection to an associated brake element, a screw having one end extending into an opening through said casing and the other end formed for connection to a different brake element, a cylindrical member rotatably mounted in said opening and projecting from said casing on opposite sides thereof, means preventing axial movement of said member with respect to said casing including a flange integral with one end thereof engaging one side of said casing and a cap fixed to the other end thereof engaging the opposite side of said casing, a sleeve within said member having threaded engagement therewith and with said screw, rotation of said cap effecting longitudinal movement of said screw and sleeve, and stop means for preventing extension of said screw and sleeve beyond predetermined limits.

3. In a brake slack adjuster, a casing adapted to be connected to an associated brake element, a screw having one end extending into an opening in said casing and the other end connected to another brake element, a cylindrical member rotatably mounted in said opening, means preventing endwise movement of said member, said means including a flange integral with said member in engagement with one side of said casing and a cap fixed to a projecting end of said member and in engagement with the opposite side of said casing, and a sleeve in said member in threaded engagement therewith and with said screw, rotation of said cap being operative to cause longitudinal movement of said sleeve and said screw, and interengaging stop means on said cap and said sleeve and on said sleeve and said screw, respectively, limiting relative longitudinal movement thereof.

4. In a device of the class described, a casing adapted to be connected to an associated element, a screw having a threaded end extending into the opening in said casing and the other end formed for connection to an associated element, a cylindrical member rotatably mounted within said opening, a sleeve within said member in threaded engagement therewith and said screw, and a cap fixed to said member and rotatable therewith, whereby rotation of said cap effects longitudinal movement of said screw and sleeve, and stop means disposed within the path of travel of the threads of said sleeve and screw preventing extension of the same beyond predetermined limits.

5. In a device of the class described, a casing adapted to be connected to an associated element, a screw having a threaded end extending into an opening in said casing and the other end formed for connection to another element, a cylindrical member rotatably mounted within said opening, a sleeve within said member and having threaded engagement therewith and with said screw, and a cap fixed to said member and rotatable therewith, rotation of said cap effecting longitudinal movement of said screw and sleeve and interengaging stop means on said cap and said sleeve and on said sleeve and said screw, respectively, limiting relative longitudinal movement thereof.

6. In a device of the class described, a casing adapted to be connected to an associated element, a screw having one end extending into an opening in said casing and the other end adapted for connection to another element, a nut rotatably mounted in said opening, means for preventing axial movement of said nut with respect to said casing, a sleeve within said nut having threaded engagement therewith and with said screw, and means for rotating said nut for effecting longitudinal movement of said screw and nut, and interengaging stop means on said cap and said sleeve and on said sleeve and said screw, respectively, limiting relative longitudinal movement thereof.

7. In a device of the class described, a casing adapted to be connected to an associated element, a screw having one end extending into an opening in said casing and the other end adapted for connection to a different element, a cylindrical member rotatably mounted in said opening, a sleeve in said member in threaded engagement therewith and with said screw, and means for rotating said member for effecting longitudinal movement of said sleeve and said screw, and interengaging stop means on said member and said sleeve for limiting relative longitudinal movement therebetween, and other interengaging stop means on said sleeve and said screw for limiting relative longitudinal movement thereof.

8. In a brake slack adjuster, relatively movable brake elements, a casing fixed to one of said elements and having a cylindrical bore, a screw having one end connected to the other element and having the other end received within a cylindrical bore in said casing, a tubular member rotatably mounted in said bore, a sleeve in threaded engagement with said member and the other end of said screw, means for preventing movement of said member axially of said screw including means for rotating said member for effecting movement of said sleeve and said screw axially of said bore and thereby relative movement of said elements.

9. In a brake slack adjuster, relatively movable brake elements, a housing fixed to one of said elements and having a cylindrical bore, a screw having one end connected to the other element and having the other end received within a cylindrical bore in said housing, a tubular member rotatably mounted in said bore, a sleeve member in threaded engagement with said tubular member and the other end of said screw, and means for rotating one of said members to effect movements of said sleeve member and said screw axially of said bore and thereby relative movement of said elements, and impositive stop means for preventing accidental rotation of said tubular member.

10. In a brake slack adjuster, relatively movable brake elements, a housing fixed to one of said elements, telescoping inner and outer tubular members rotatably mounted in said housing and having threaded engagement with each other, a screw having one end thereof fixed to the other of said elements and the other end thereof in threaded engagement with said inner member, means for preventing axial movement of said outer member including means for rotating the same to effect movement of said inner member and said screw into and out of said housing and thereby movement of said elements relative to each other.

11. In a brake slack adjuster, relatively movable brake elements, a housing fixed to one of said elements and having a cylindrical bore, a tubular member rotatably mounted in said bore, a sleeve member in threaded engagement with said member and the other end of said screw, and means for rotating both of said members to effect movements of said sleeve member and said screw axially of said bore and thereby relative movement of said elements, and means for lubricating the threads of said members and said screw.

12. In a brake slack adjuster, spaced brake elements, a casing connected to one of said elements and having a cylindrical bore, a screw member having one end connected to the other of said elements, means rotatably mounted in said bore including a member in threaded engagement with the other end of said screw member for effecting axial movement of said screw member and thereby relative movement of said elements, and stop means disposed within the path of travel of the threads of said members preventing axial movement of said screw member beyond predetermined limits.

FRED E. BACHMAN.

REFERENCES CITED

The following references are of record in the file of this patent:

UNITED STATES PATENTS

| Number | Name | Date |
| --- | --- | --- |
| 2,246,340 | Blomberg | June 17, 1941 |
| 373,381 | Snyder | Nov. 15, 1887 |
| 1,947,444 | Baselt | Feb. 20, 1934 |
| 1,600,821 | Hedgcock | Sept. 21, 1926 |
| 2,374,536 | Goepfrich | Apr. 24, 1945 |